US007505058B2

(12) United States Patent
Erickson et al.

(10) Patent No.: US 7,505,058 B2
(45) Date of Patent: Mar. 17, 2009

(54) SINGLE HEAD RECEIPT PRINTER

(75) Inventors: Dirk Erickson, Austin, TX (US); James Brewer, Leander, TX (US); Dustin Sorenson, Austin, TX (US)

(73) Assignee: Dell Product L.P., Round Rock, TX (US)

( * ) Notice: Subject to any disclaimer, the term of this patent is extended or adjusted under 35 U.S.C. 154(b) by 398 days.

(21) Appl. No.: 11/297,255

(22) Filed: Dec. 7, 2005

(65) Prior Publication Data

US 2007/0126848 A1 Jun. 7, 2007

(51) Int. Cl.
*B41J 2/435* (2006.01)
*G06F 15/00* (2006.01)

(52) U.S. Cl. .......................... 347/224; 358/1.8; 902/18

(58) Field of Classification Search ................. 347/224; 358/1.8; 902/18
See application file for complete search history.

(56) References Cited

U.S. PATENT DOCUMENTS

| | | | | |
|---|---|---|---|---|
| 4,520,370 | A | 5/1985 | Fujii et al. | 346/76 |
| 4,853,361 | A | 8/1989 | Satake et al. | 503/201 |
| 5,066,962 | A | 11/1991 | Sarraf | 346/76 |
| 5,104,767 | A | 4/1992 | Nakamura | 430/138 |
| 5,323,180 | A * | 6/1994 | Kuberka et al. | 347/215 |
| 6,155,726 | A | 12/2000 | Ishikawa et al. | 396/575 |
| 6,183,933 | B1 | 2/2001 | Ishikawa et al. | 430/256 |
| 6,569,585 | B2 | 5/2003 | Caspar et al. | 430/14 |
| 2003/0002908 | A1 * | 1/2003 | Hirabayashi et al. | 400/649 |
| 2006/0023060 | A1 * | 2/2006 | Towner | 347/259 |

* cited by examiner

*Primary Examiner*—Stephen D Meier
*Assistant Examiner*—Sarah Al-Hashimi
(74) *Attorney, Agent, or Firm*—Hamilton & Terrile, LLP; Stephen A. Terrile

(57) ABSTRACT

A receipt printer which includes a light source providing a beam, a light source movement mechanism which moves the beam between a first position and a second position, a laser mechanism which receives the beam when the beam is in the first position and uses the beam to print onto plain paper, and a thermal mechanism that receives the beam when the beam is in the second position and uses the beam to print onto thermal paper is disclosed.

5 Claims, 5 Drawing Sheets

SINGLE HEAD RECEIPT PRINTER

BACKGROUND OF THE INVENTION

1. Field of the Invention

The present invention relates to point of sale terminals and more particularly to receipt printers for use with a point of sale terminal.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a point of sale (POS) terminal. A point-of-sale terminal is a computerized replacement for a cash register. A point of sale terminal can include the ability to record and track customer orders, process credit and debit cards, connect to other systems in a network, and manage inventory. Generally, a point of sale terminal has as its core an information handling system, which is provided with application specific programs and I/O devices for the particular environment in which the point of sale terminal will serve. A point of sale system for a restaurant, for example, is likely to have all menu items stored in a database that can be queried for information in a number of ways. Point of sale terminals are used in most industries that have a point of sale such as retail stores, restaurants, and lodging.

Known point of sale solutions often include receipt printers. There are two main categories of receipt printers, single station receipt printers and multi-station receipt printers. A single station receipt printer is a printer that is dedicated to printing out a single receipt (such as a 3 inch wide receipt). Thermal receipt technology has become a popular choice for single station receipt printers because of the fast print speed and lack of consumables other than the thermal paper itself.

Multi-station printers combine the thermal receipt printing functionality with an additional one or more print heads that are used for endorsing checks, filling out checks or printing custom sized forms. Due to the need for multiple print heads, multi-station printers are often expensive and can be unreliable. The solutions for printing on plain paper checks or forms are usually either an impact print mechanism or an inkjet print mechanism. Both of these solutions are slower than thermal and often require the use of additional consumables (either print ribbon or ink cartridges).

It is desirable to provide a receipt printer which includes multiple printing technologies without requiring multiple print heads or without requiring impact or inkjet print mechanisms.

SUMMARY OF THE INVENTION

In accordance with the present invention, a receipt printer is provided which includes multiple printing technologies without requiring multiple print heads or without requiring impact or inkjet print mechanisms. More specifically, the receipt printer provides a low cost highly reliable printer that can print to thermal paper for high volume receipts and plain paper checks and forms. In an embodiment, the receipt printer combines a laser printer mechanism and a thermal print mechanism using a single light source to drive both the laser printer mechanism and the thermal print mechanism.

More specifically, in an embodiment, the receipt printer includes a single paper path which is used simultaneously for plain paper and for thermal paper. The light source may be a laser diode. The light source is coupled to a mechanism that has at least two positions. A first position allows an emitted beam to operate with the laser printer mechanism, by for example charging an OPC/toner mechanism, for printing on plain paper. A second position allows the emitted beam to directly strike the thermal paper. Alternately, the beam of the light source may be redirected after the beam is emitted from the light source by a movable mirror (using for example, MIMS or DLP technology). In another embodiment, a second light source could also be used to produce a second emitted beam instead of moving the light source or redirecting the beam.

Additionally, the receipt printer may also be extended to include a sensor source such as a CCD linear scanner which is tuned to the frequency of the light source. In operation, a sheet to be scanned is placed in front of the light source via the single paper path and the sensor detects light reflected at each scan point to generate an image array.

In one embodiment, the invention relates to a receipt printer which includes a light source providing a beam, a light source movement mechanism which moves the beam between a first position and a second position, a laser mechanism which receives the beam when the beam is in the first position and uses the beam to print onto plain paper, and a thermal mechanism that receives the beam when the beam is in the second position and uses the beam to print onto thermal paper.

In another embodiment, the invention relates to a point of sale terminal which includes system controller and a receipt printer coupled to the system controller. The receipt printer includes which includes light source providing a beam, a light source movement mechanism which moves the beam between a first position and a second position, a laser mechanism which receives the beam when the beam is in the first position and uses the beam to print onto plain paper, and a thermal mechanism that receives the beam when the beam is in the second position and uses the beam to print onto thermal paper.

In another embodiment, the invention relates to an information handling system which includes a system controller and a receipt printer coupled to the system controller. The receipt printer includes which includes light source providing a beam, a light source movement mechanism which moves the beam between a first position and a second position, a laser mechanism which receives the beam when the beam is in the first position and uses the beam to print onto plain paper, and a thermal mechanism that receives the beam when the beam is in the second position and uses the beam to print onto thermal paper.

In another embodiment, the invention relates to a printer which includes which includes light source providing a beam, a light source movement mechanism which moves the beam between a first position and a second position, a laser mechanism which receives the beam when the beam is in the first position and uses the beam to print onto plain paper, and a thermal mechanism that receives the beam when the beam is in the second position and uses the beam to print onto thermal paper.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
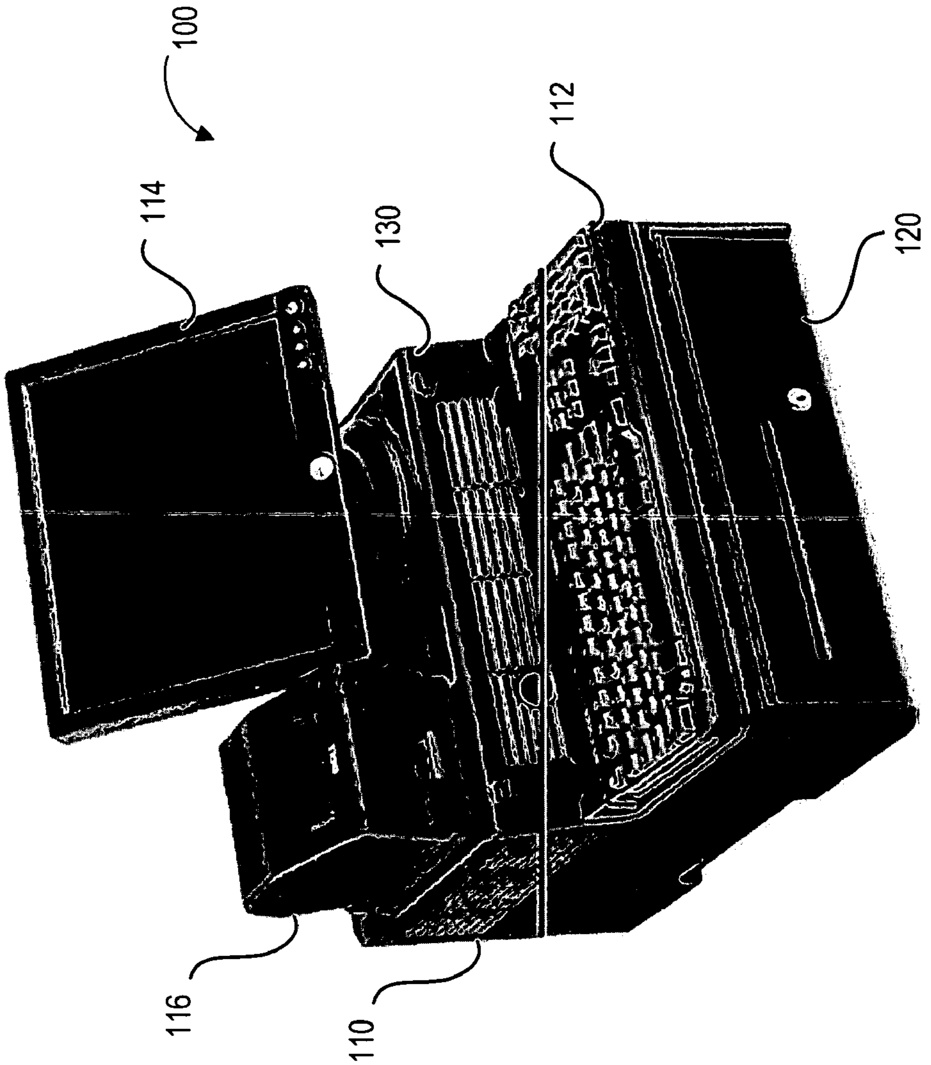
FIG. 1 shows a perspective view of a point of sale terminal in accordance with the present invention.

Referring to FIG. 1, a perspective view of a point of sale terminal 100 in accordance with the present invention is shown. More specifically, the point of sale terminal 100 includes terminal housing 110, a keyboard 112, a monitor 114 and a printer 116. The housing 110 includes a cash drawer 120 as well as a removable face panel 130. The form factor of the terminal housing 110 is such that the monitor 114 and the printer 116 fit comfortably on top of the terminal housing 110. The printer 114 includes multiple paper path functionality such that the printer may print on both plain paper and thermal paper via a single paper path.

Figure 2:
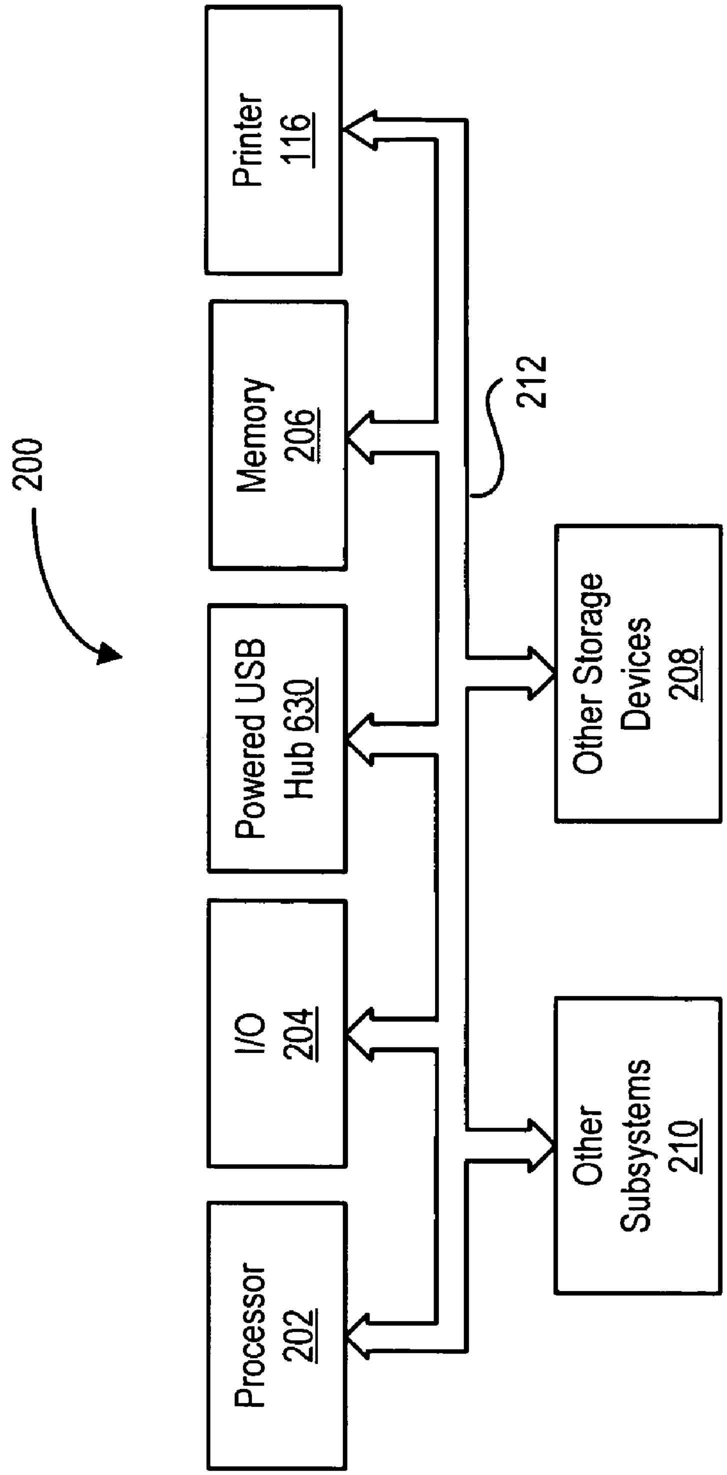
FIG. 2 shows a schematic block diagram of an information handling system for use within a point of sale terminal.

Referring briefly to FIG. 2, a system block diagram of an information handling system 200 is shown. The information handling system 200 is an example the controller system 210 included within the point of sale terminal 100. The information handling system 200 includes a processor 202, input/output (I/O) devices 204, such as the display 114, the keyboard 112 as well as a mouse and associated controllers, non-volatile memory 204 such as a hard disk and drive, and other storage devices 208, such as a floppy disk and drive and other memory devices, and various other subsystems 210, all interconnected via one or more buses 212. The information handling system 200 also includes a powered USB hub 230. The information handling system may also include the printer 116.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
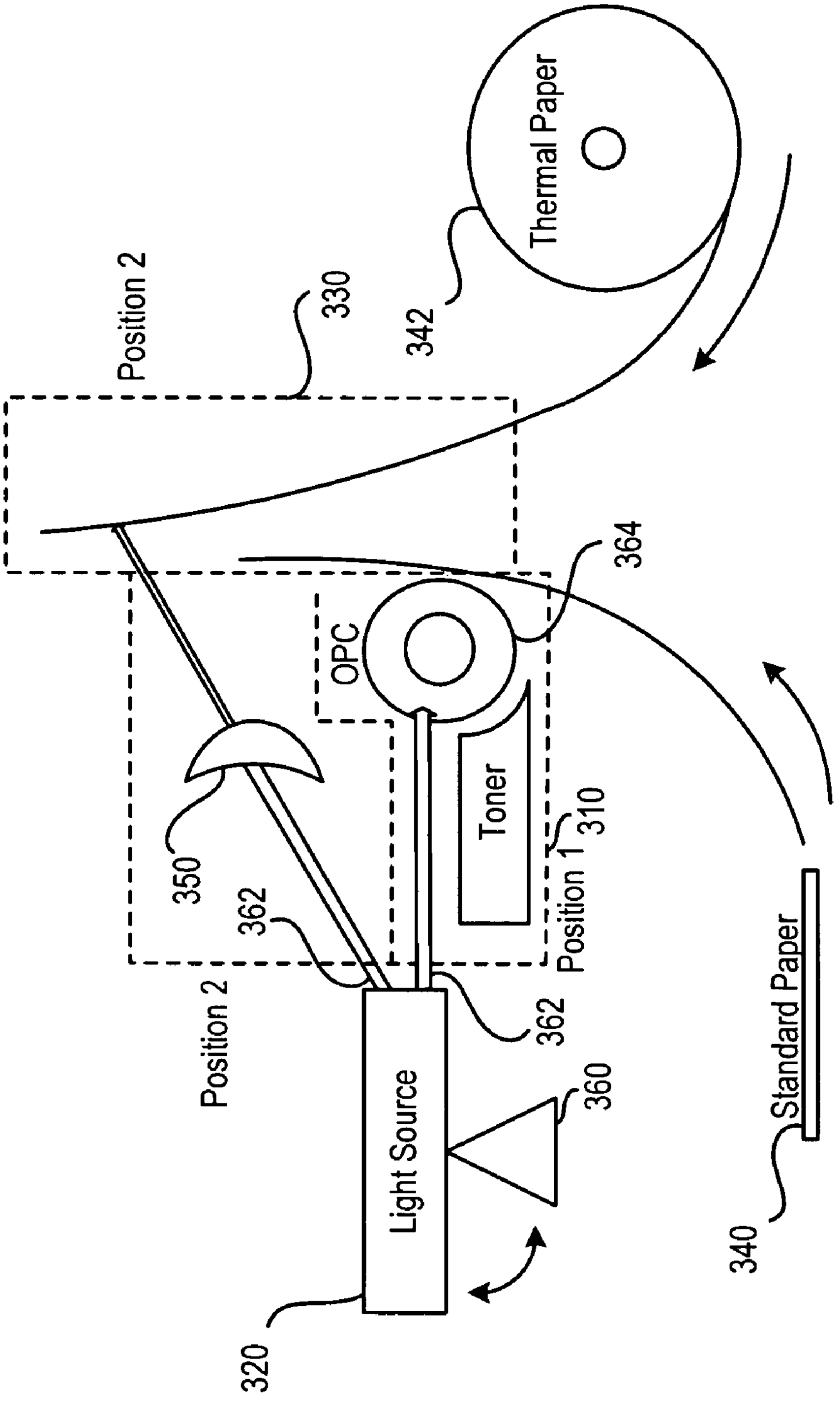
FIG. 3 shows a block diagram of a receipt printer for use with the point of sale terminal.

Referring to FIG. 3, a block diagram of a receipt printer 116 for use with the point of sale terminal is shown. The receipt printer 116 includes multiple printing technologies without requiring multiple print heads or without requiring impact or inkjet print mechanisms. More specifically, the receipt printer 116 can print to thermal paper for high volume receipts and plain paper checks and forms. The receipt printer combines a laser printer mechanism 310 and a thermal print mechanism 312 using a single light source 320 which drives both the laser printer mechanism 310 and the thermal print mechanism 312. Thus, the light source 320 is conceptually part of both the laser print mechanism 310 and the thermal print mechanism 312.

The receipt printer 116 includes a single paper path 330 through which both standard paper 340 and thermal paper 342 pass to be printed via either the laser printer mechanism 310 or the thermal print mechanism 312.

Depending on the intensity of the light source 320, the thermal print mechanism 312 might include a lens 350 to focus the energy of the light source 320. In one embodiment, the light source may be a laser diode.

The light source is coupled to a mechanism 360 that has at least two positions. A first position allows an emitted beam 362 to operate with the laser printer mechanism 310, by for example charging an OPC/toner mechanism 364, for printing on plain paper 340. A second position allows the emitted beam 262 to directly strike the thermal paper 342. Alternately, the beam 362 of the light source 320 may be redirected after the beam 362 is emitted from the light source by a movable mirror (using for example, MIMS or DLP technology).

Figure 4:
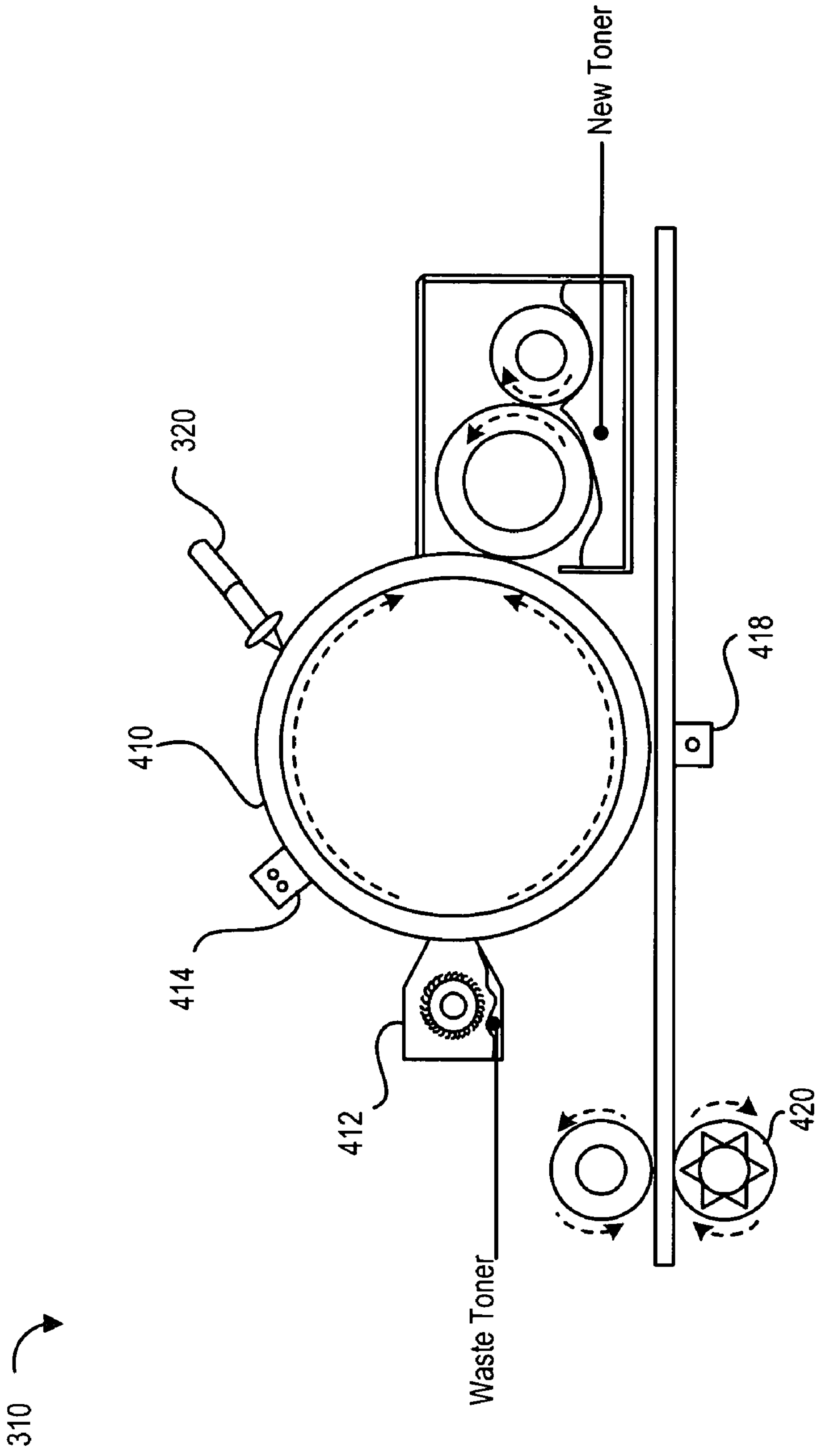
FIG. 4 shows a block diagram of the operation of the laser portion of the receipt printer.

Referring to FIG. 4, a block diagram of the operation of the laser mechanism 310 of the receipt printer 116 is shown. The laser mechanism 310 includes a photoreceptor coated drum or belt 410, a cleaner 412, a charger 414, a toner cartridge 416, a charger 418 and a fuser 420. It will be appreciated that variations of the laser mechanism 310 are contemplated.

In operation, the cleaner 412 cleans any remaining toner from the drum 410 at step 1. Next the charger 414 erases and charges the photoreceptor on the spinning drum at step 2. Next the light source 320 exposes the photoreceptor to light at step 3. Next, the toner cartridge 416 applies toner to the drum 410 at step 4. Next, the image is transferred onto the paper 340 by charging the paper to pull the toner off of the drum 410 via the charger 418 at step 5. Next, the fuser 420 heats and compresses the melted toner into the paper fibers at step 6. Next, the paper 340 exits the print mechanism 310.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Figure 5:
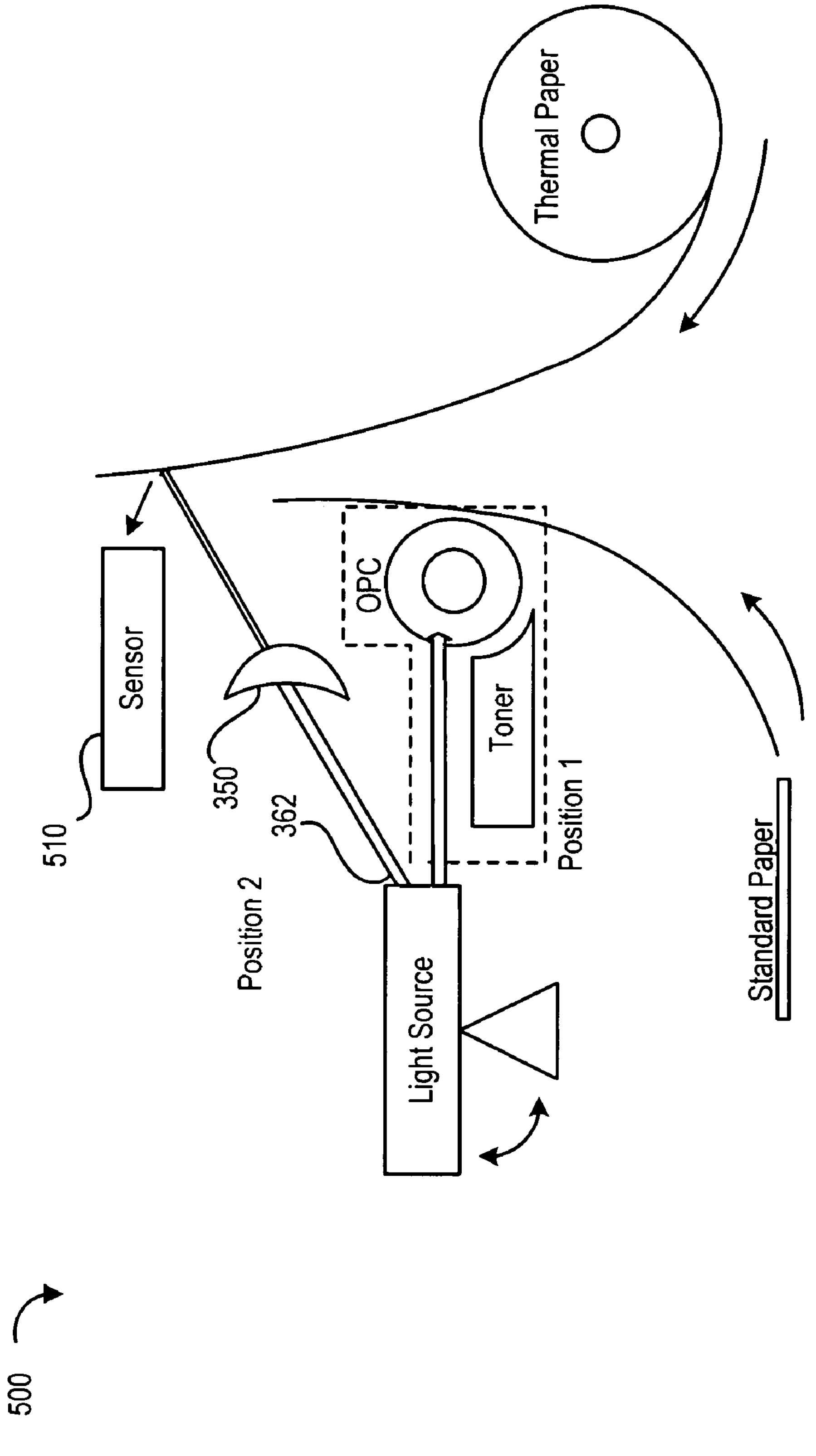
FIG. 5 shows a block diagram of another receipt printer for use with the point of sale terminal.

For example, FIG. 5 shows a block diagram of another receipt printer for use with the point of sale terminal. The receipt printer 500 includes a sensor 510 such as a CCD linear scanner. The sensor 510 is tuned to the frequency of the light source 320. In operation, a sheet to be scanned is placed in front of the light source 320 via the single paper path 330 and the sensor 510 detects light reflected at each scan point to generate an image array.

Also for example, a second light source could also be used to produce a second emitted beam instead of moving the light source or redirecting the beam.

Consequently, the invention is intended to be limited only by the spirit and scope of the appended claims, giving full cognizance to equivalents in all respects.

What is claimed is:

1. A multiple print type receipt printer comprising:

a light source, the light source providing a beam;

a light source movement mechanism, the light source movement mechanism moving the beam between a first position, the first position allowing the beam to print onto plain paper, and a second position, the second position allowing the beam to print onto thermal paper;

a laser mechanism, the laser mechanism receiving the beam when the beam is in the first position and using the beam to print onto plain paper; and a thermal mechanism, the thermal mechanism receiving the beam when the beam is in the second position and using the beam to print onto thermal paper.

2. The receipt printer of claim 1 wherein:

the light source movement mechanism is a mechanical mechanism for moving the light source between the first position and the second position.

3. The receipt printer of claim 1 wherein:

the light source includes a laser diode.

4. The receipt printer of claim 1 further comprising:

a paper path, the paper path being configured such that the plain paper and the thermal paper pass through the paper path.

5. The receipt printer of claim 1 further comprising:

a sensor mechanism, the sensor mechanism being oriented such that the sensor receives a reflection of the beam when the beam strikes paper passing through the paper path.

* * * * *